US009316828B2

(12) United States Patent
Yamada et al.

(10) Patent No.: US 9,316,828 B2
(45) Date of Patent: Apr. 19, 2016

(54) THREE-DIMENSIONAL VEHICLE BACKUP CAMERA DISPLAY SYSTEM AND METHOD (75) Inventors: Hajime Yamada, Rancho Palos Verdes, CA (US); Stuart Yamamoto, La Mirada, CA (US)

(73) Assignee: Honda Motor Co., Ltd., Tokyo (JP)

( * ) Notice: Subject to any disclaimer, the term of this patent is extended or adjusted under 35 U.S.C. 154(b) by 753 days.

(21) Appl. No.: 13/591,545

(22) Filed: Aug. 22, 2012

(65) Prior Publication Data
US 2014/0055601 A1 Feb. 27, 2014

(51) Int. Cl.
*H04N 5/217* (2011.01)
*G02B 27/01* (2006.01)
*B60R 1/00* (2006.01)
*H04N 7/18* (2006.01)
*H04N 5/232* (2006.01)

(52) U.S. Cl.
CPC . *G02B 27/01* (2013.01); *B60R 1/00* (2013.01); *B60R 2300/20* (2013.01); *G02B 2027/014* (2013.01); *G02B 2027/0134* (2013.01); *G02B 2027/0138* (2013.01); *H04N 5/232* (2013.01); *H04N 7/18* (2013.01)

(58) Field of Classification Search
CPC ....................................................... H04N 5/217
See application file for complete search history.

(56) References Cited

U.S. PATENT DOCUMENTS

| 5,121,099 | A | 6/1992 | Hegg et al. |
| 6,067,078 | A | 5/2000 | Hartman |
| 6,262,785 | B1 | 7/2001 | Kim |
| 6,741,223 | B2 | 5/2004 | Kobayashi et al. |
| 7,289,619 | B2 | 10/2007 | Vivadelli et al. |
| 7,511,683 | B2 | 3/2009 | Sumiyoshi |
| 7,538,691 | B2 | 5/2009 | Horstemeyer |
| 7,554,437 | B2 | 6/2009 | Axelsen |
| 7,660,727 | B2 | 2/2010 | Halavais et al. |
| 7,669,543 | B2 | 3/2010 | Soltendieck et al. |
| 7,885,845 | B2 | 2/2011 | Mizrachi et al. |
| 7,982,609 | B2 | 7/2011 | Padmanabhan et al. |
| 8,041,586 | B2 | 10/2011 | Jethani et al. |
| 8,068,037 | B2 | 11/2011 | Horstemeyer |
| 8,073,565 | B2 | 12/2011 | Johnson |
| 8,136,277 | B2 | 3/2012 | Patterson et al. |

(Continued)

FOREIGN PATENT DOCUMENTS

| GB | 1413324 | 11/1975 |
| JP | 200066131 A | 3/2000 |

(Continued)

*Primary Examiner* — Jefferey Harold
*Assistant Examiner* — Justin Sanders
(74) *Attorney, Agent, or Firm* — Arent Fox LLP (57) ABSTRACT

A system and method for displaying a vehicle backup image are presented. The system includes at least one camera supported by the vehicle. The camera creates an image of a vehicle environment in which the vehicle is disposed. The image includes a first image section of a first portion of the vehicle environment and a second image section of an adjacent second portion of the vehicle environment. A display operatively connects to the camera to receive the first and second image sections. The display includes a first display section having a first display surface displaying the first image section and disposed at a first angle. The display further includes a second display section having a second display surface displaying the second image section and disposed at a second angle such that the second display surface and the first display surface define an obtuse angle therebetween.

19 Claims, 5 Drawing Sheets

(56) References Cited

U.S. PATENT DOCUMENTS

| | | | |
|---|---|---|---|
| 2005/0146607 A1* | 7/2005 | Linn | B60R 1/00 348/148 |
| 2006/0015376 A1 | 1/2006 | Sattler et al. | |
| 2007/0162315 A1 | 7/2007 | Hodges | |
| 2007/0165108 A1* | 7/2007 | Yuasa | B60R 1/00 348/148 |
| 2007/0271129 A1 | 11/2007 | Dutton et al. | |
| 2007/0299966 A1 | 12/2007 | Crawford et al. | |
| 2008/0109289 A1 | 5/2008 | Vivadelli et al. | |
| 2008/0129756 A1* | 6/2008 | Iwano | B60R 1/00 345/632 |
| 2009/0292566 A1 | 11/2009 | Bossert | |
| 2009/0300174 A1 | 12/2009 | Floris et al. | |
| 2010/0070314 A1 | 3/2010 | Jethani et al. | |
| 2010/0082376 A1 | 4/2010 | Levitt | |
| 2010/0292886 A1* | 11/2010 | Szczerba | G01C 21/365 701/31.4 |
| 2011/0227704 A1 | 9/2011 | Padmanabhan et al. | |
| 2011/0239011 A1 | 9/2011 | Waris et al. | |
| 2012/0127646 A1* | 5/2012 | Moscovitch | B60R 11/02 361/679.09 |

FOREIGN PATENT DOCUMENTS

| | | |
|---|---|---|
| JP | 2003114962 A | 4/2003 |
| JP | 2004258802 | 9/2004 |
| JP | 2006133647 | 5/2006 |
| JP | 2006133647 A | 5/2006 |
| JP | 200877648 | 4/2008 |
| JP | 201187096 | 4/2011 |

* cited by examiner

FIG. 7

THREE-DIMENSIONAL VEHICLE BACKUP CAMERA DISPLAY SYSTEM AND METHOD

BACKGROUND

Many vehicles include an interactive display interface (for example, an LCD touch-sensitive screen) that receives user inputs and presents various types of information. For example, in some modes the display depicts various actuatable "buttons" for controlling the vehicle's audio equipment or climate control system. In some modes, the display depicts a map image and/or navigation instructions for guiding the vehicle operator to a selected destination. In other modes, the display shows video images received from a rearwardly-facing or "backup" camera mounted on the vehicle.

These backup cameras and displays advantageously assist the vehicle operator by providing views of areas that cannot otherwise be easily observed (for example, directly behind the vehicle). However, the backup images provided by these systems do not typically include depth information. As such, it can be difficult for the operator to generally determine the distance to objects behind the vehicle.

SUMMARY

The disclosure relates in general to a system and method for an in-cabin backup display for a vehicle and, more particularly, to a system and method for an "effective three-dimensional" in-cabin vehicle display including an angled multiple-section structure.

In one implementation, the present disclosure is a display system for a vehicle. The system includes at least one camera supported by the vehicle. The camera creates an image of a vehicle environment in which the vehicle is disposed. The image includes a first image section of a first portion of the vehicle environment and a second image section of a second portion of the vehicle environment adjacent the first portion of the vehicle environment. A display is supported by the vehicle and operatively connects to the camera to receive the first and second image sections. The display includes a first display section having a first display surface disposed at a first angle, and the first display surface displays the first image section. The display further includes a second display section having a second display surface disposed at a second angle such that the second display surface and the first display surface define an obtuse angle therebetween. The second display section displays the second image section.

In another implementation, the present disclosure is a vehicle including an internal cabin that houses a support structure and at least one backup camera supported externally from the internal cabin. The backup camera creates a rearward image of a vehicle environment in which the vehicle is disposed. The rearward image includes a lower image section of a lower portion of the vehicle environment and an upper image section of an upper portion of the vehicle environment. The vehicle further includes a display supported by the support structure within the internal cabin. The display operatively connects to the backup camera to receive the upper and lower image sections. The display includes a lower display section disposed in a first plane and displaying the lower image section. The display further includes an upper display section disposed in a second plane. The second plane and the first plane define an angle therebetween substantially disposed in a vertical plane, and the upper display section displays the upper image section.

In another implementation, the present disclosure is a method of displaying information in a vehicle. The method includes obtaining an image of a portion of a vehicle environment in which a vehicle is disposed via at least one rearwardly facing camera supported by the vehicle. The method includes transmitting the image to a display including a lower display section having a lower viewing surface and an upper display section having an upper viewing surface. The lower viewing surface and the upper viewing surface define an obtuse angle therebetween. The method includes displaying a lower image section of the image via the lower viewing surface and displaying an upper image section of the image via the upper viewing surface.

DETAILED DESCRIPTION OF THE DRAWINGS

The disclosure relates in general to a system and method for an in-cabin backup display for a vehicle and, more particularly, to a system and method for an "effective three-dimensional" in-cabin vehicle display including an angled multiple-section structure.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. The system and method may both be practiced without one or more of the specific details, or with other methods, components, materials, and so forth. In other instances, well-known structures, materials, or operations are not shown or described in detail to avoid obscuring aspects of the disclosure.

Figure 4:
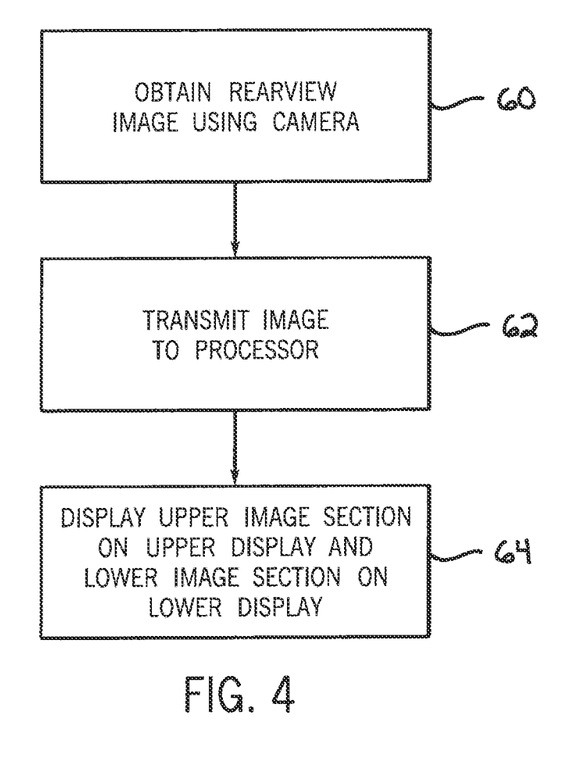
FIG. 4 illustrates steps in a process of displaying a backup camera image on the display of FIG. 1.

The schematic flow chart diagrams included are generally set forth as logical flow-chart diagrams (for example, FIG. 4). As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system and method displays an image (a still image or a video image) obtained by a rearwardly-facing or "backup" vehicle camera in an "effective three-dimensional" manner to provide depth and object proximity information to the vehicle operator. This effective three-dimensional image is achieved by horizontally dividing the backup image into a lower image section and an upper image section. The lower image section typically includes the ground immediately behind the vehicle and nearby objects, and the upper image section typically includes the sky and distant objects. A multiple-section angled display device displays the divided image. Specifically, a lower display section displays the lower image section. An upper display section that is disposed at an angle relative to the lower display section displays the upper image section. Thus, the combination of the images on their respective displays forms a horizontal separation between the ground and sky. The angles and positions of the system are formed to reflect this separation.

In some implementations, the upper display section is disposed at a relatively inclined angle from a horizontal plane, and lower display section is disposed at a relatively flat angle from the horizontal plane and rearwardly relative to the upper display section (that is, toward the vehicle operator). As such, the lower image section is physically closer to the operator than the upper image section. This advantageously emphasizes that objects in the lower image section are generally closer to the vehicle than those in the upper image section.

In some implementations, the upper and lower display sections are also capable of together displaying a navigation map and/or instructions. The upper display section displays an upper section of the navigation map and/or instructions, and the lower display section displays a lower section of the navigation map and/or instructions. If a map is displayed, the upper display section displays distant roads and/or landmarks and the lower display section displays nearby roads and/or landmarks. This advantageously emphasizes that nearby roads and/or landmarks are generally closer to the vehicle than distant ones.

Figure 1:
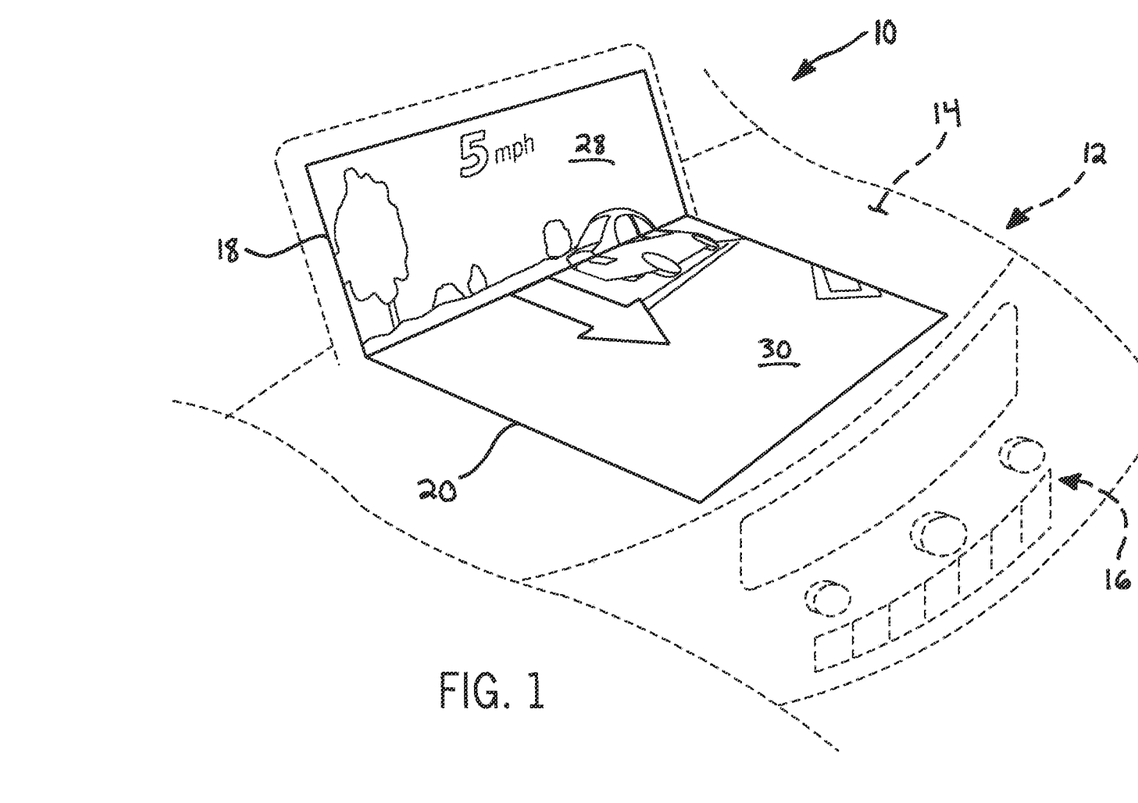
FIG. 1 illustrates the present effective three-dimensional display supported on the dashboard of a vehicle and displaying an image received from a rearwardly-facing backup camera.
Figure 2:
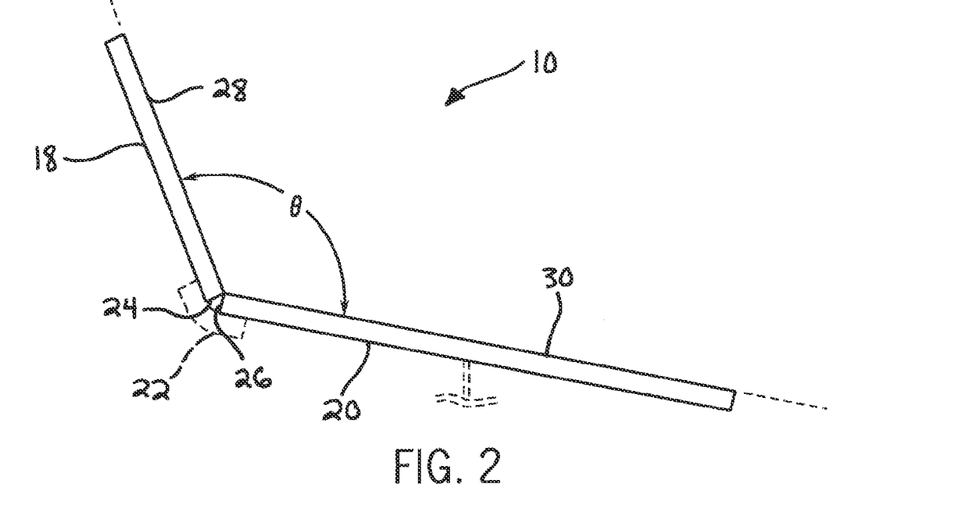
FIG. 2 is a side view of the display shown in FIG. 1.

FIGS. 1 and 2 illustrate an implementation of the present effective three-dimensional or angled multiple-section display 10. The display 10 is supported by a support structure within the vehicle's internal cabin 12. In some implementations, the support structure is a portion of the vehicle's dashboard 14 above an audio equipment interface 16 (that is, the "radio"). In some implementations, the display 10 is disposed in other locations, such as within an instrument cluster disposed forwardly of the vehicle operator (not shown).

As described above, the display 10 includes an upper display section 18 and a lower display section 20 disposed rearwardly of the upper display section 18. Stated another way, the lower display section 20 is closer to the vehicle operator than the upper display section 18.

The upper display section 18 and the lower display section 20 may each be any type of display, such as liquid crystal displays (LCDs), light-emitting diode (LED) displays, organic LED (OLED) displays, digital light processing (DLP) displays, electroluminescent (ELD) displays, plasma display panels (PDPs), and the like. The upper display section 18 and the lower display section 20 may also be any types of displays that are transparent or translucent in some operating modes. For example, when the vehicle is not in reverse gear, the upper display section 18 may be transparent and a vehicle instrument, such as a speedometer, may be viewed therethrough.

In some implementations, the upper display section 18 and the lower display section 20 are separately fixedly supported by the support structure. Alternatively, in some implementations the support structure directly supports one of the upper and lower display sections 18 or 20 and a connecting joint 22 (FIG. 2) connects the display sections 18 and 20 proximate a lower edge 24 of the upper section 18 and an upper edge 26 of the lower section 20.

Regardless of the specific display type and support components that are used, the upper display section 18 and the lower display section 20 each include a display surface 28 and 30, respectively, on which images are displayed. As shown most clearly in FIG. 2, the lower display surface 30 is offset from a horizontal plane (that is, horizontal relative to the vehicle) by a relatively small angle. In some implementations, this angle is substantially 15 degrees but varies depending on the user's vehicle (as used herein, the term substantially means within 10 degrees from a specified angle). The upper display surface 28 is offset from the horizontal plane by a relatively large angle. In some implementations, this angle is substantially 110 degrees, but varies depending on vehicle. Furthermore, an angle θ between the upper display surface 28 and the lower display surface 30 is an obtuse angle (that is, greater than 90 degrees and less than 180 degrees) and the upper display surface 28 is generally vertically aligned (that is, more vertical than horizontal, and vertical being relative to the vehicle).

In some implementations, the upper and lower display surfaces 28 and 30 are also positioned to provide the appearance of a continuous, uninterrupted display surface and, as such, continuous, uninterrupted images. Specifically, a corner of the lower edge 24 of the upper display section 18 abuts a corner of the upper edge 26 of the lower display section 20. In addition, in some embodiments at least 70 percent of the upper display section 18 is disposed vertically above the lower display section 20.

Figure 3:
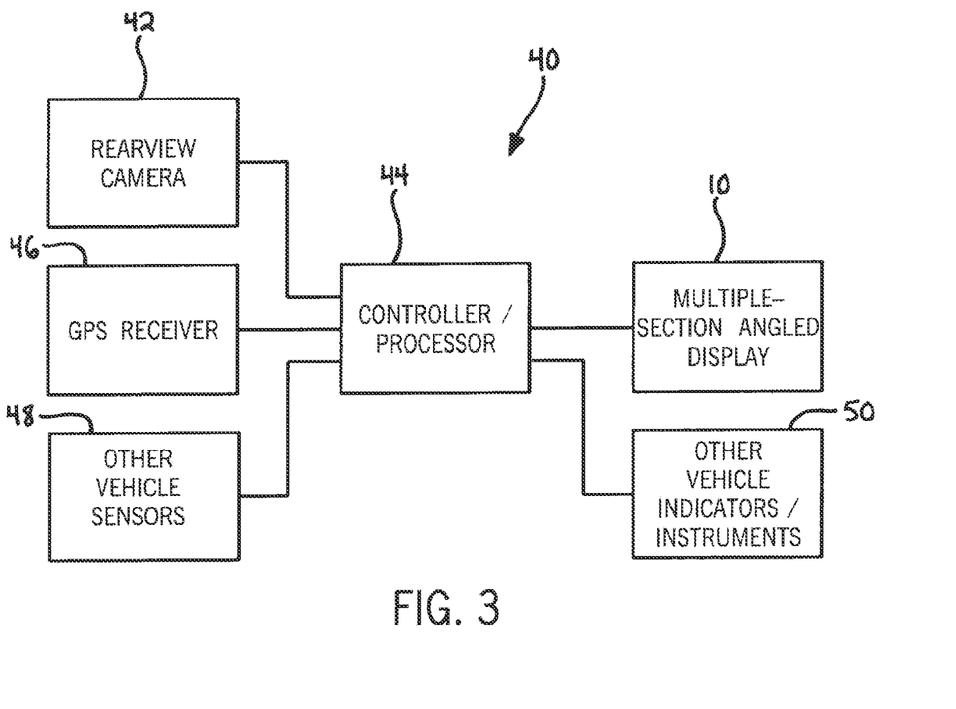
FIG. 3 illustrates electronic components in communication with the display of FIG. 1.

FIGS. 3 and 4 illustrate other display system components that communicate with the angled multiple-section display 10 and process steps for sending data from the other components to the display 10 to display an image, respectively. The display system 40 includes a rearwardly facing or "backup" camera 42 externally supported by the vehicle. The camera 42 may be any type of backup camera mounted to the rear of the vehicle using any well-known means.

Regardless of the specific type that is used, the camera 42 observes and creates an image of the vehicle's rearward environment at step 60 (FIG. 4). At step 62, the camera 42 transmits the image to an electronic controller or processor 44, which may be any type of processor typically used in vehicles. The processor 44 horizontally divides the image into a lower image section (typically including the ground and nearby objects) and an upper image section (typically including the sky and distant objects) using any well-known image-splitting process. The processor 44 transmits the upper and lower image sections to the upper display section 18 and the lower display section 20, respectively. At step 64, the upper display surface 28 depicts the upper image section and the lower display surface 30 depicts the lower image section.

Figure 5:
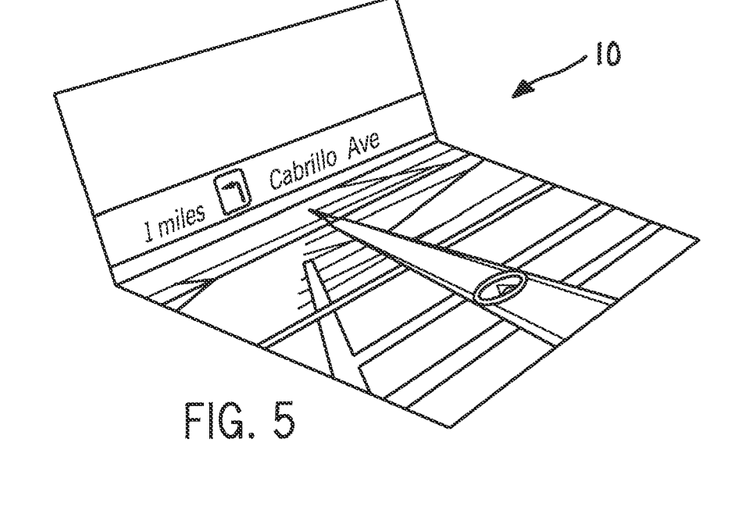
FIG. 5 illustrates the display of FIG. 1 showing a navigation map and instructions.
Figure 6:
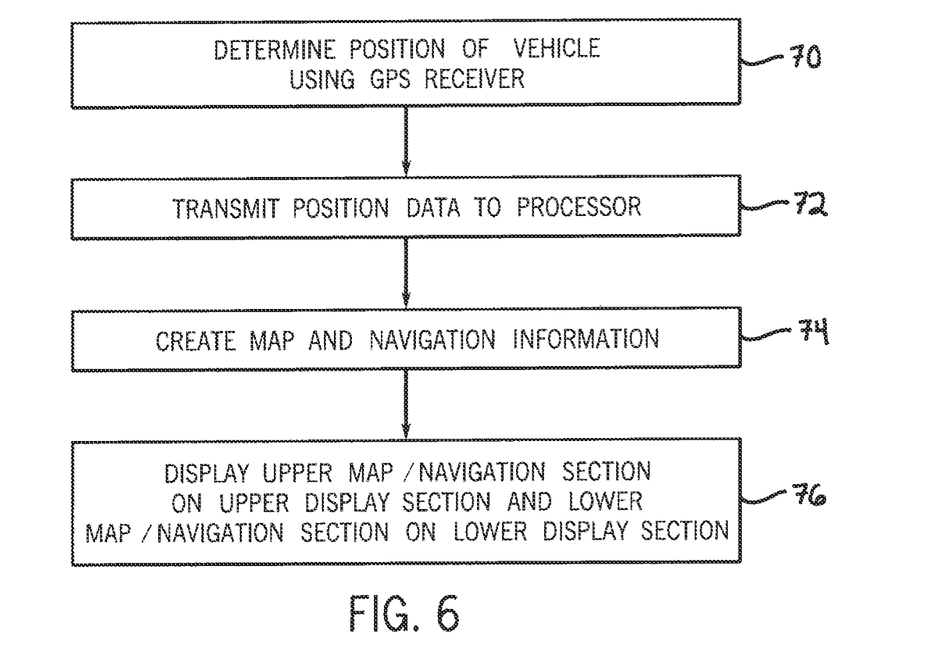
FIG. 6 illustrates steps in a process of displaying the navigation map and instructions of FIG. 5 on the display of FIG. 1.

In some implementations, the angled multiple-section display 10 additionally depicts other types of information. FIGS. 5 and 6 illustrate a navigation map and instructions depicted by the display 10 and process steps for sending map and navigation data from other components of the display system 40 to the display 10, respectively. The display system 40 includes a global positioning system (GPS) receiver 46 (FIG. 3) that determines its position (and, therefore, the position of the vehicle) using known methods at step 70 (FIG. 6). The GPS receiver 46 transmits the position data to the processor 44 at step 72. Based on the position data, the processor 44 creates a map in which the vehicle's position is indicated at step 74. The processor 44 also creates navigation information for travelling to an operator-selected destination. The processor 44 then transmits the map and the navigation information to the display 10. At step 76, the upper display surface 28 depicts an upper section of the map and navigation information and the lower display surface 30 depicts a lower section of the map and navigation information.

In some implementations and if the display 10 depicts a map, the upper display surface 28 depicts distant roads and/or landmarks and the lower display surface 30 displays nearby roads and/or landmarks. Similarly, if the display 10 provides navigation information, the lower display surface 30 displays immediately upcoming instructions and the upper display surface 28 displays subsequent instructions.

In some implementations, the processor 44 receives data from other vehicle sensors 48 (FIG. 3, for example, fuel gauge sensors, speed sensors, external temperature sensors, and the like) and the display 10 depicts parameters associated with the data (for example, fuel consumption, vehicle speed, external temperature, and the like). The parameters may be displayed together with the backup image. For example and as shown in FIG. 1, the upper display surface 28 simultaneously depicts both the upper image section and the vehicle's speed and the lower display surface 30 simultaneously depicts both the lower image section and an arrow indicating the vehicle's direction of travel.

Figure 7:
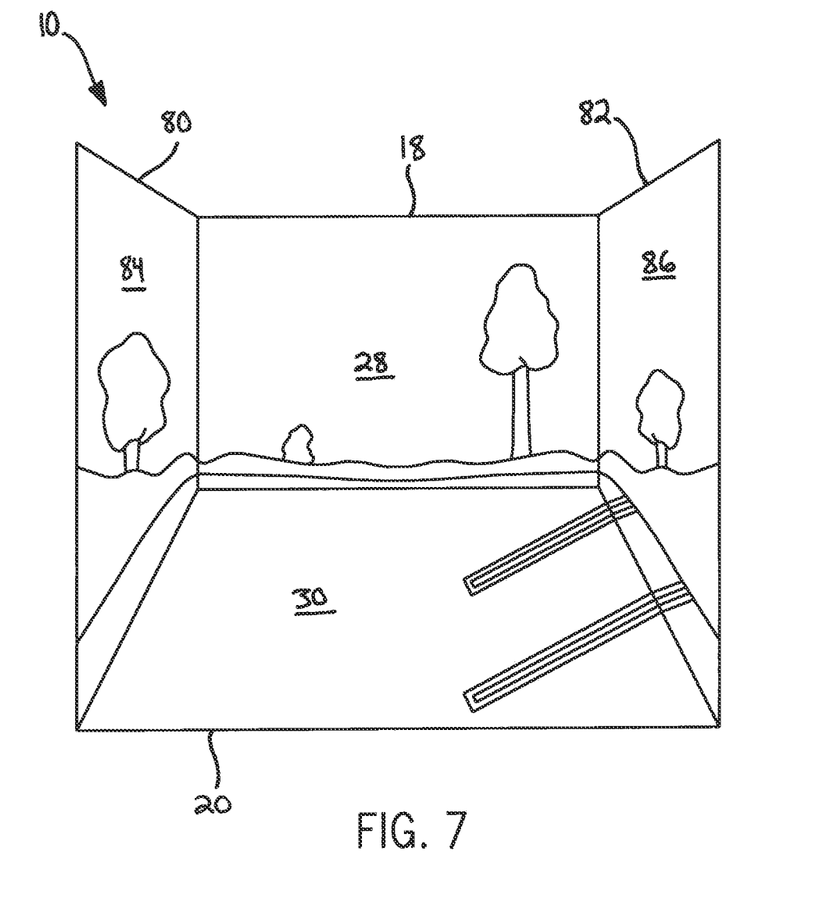
FIG. 7 illustrates an implementation of the present effective three-dimensional display including side display sections.

In some implementations and as shown in FIG. 7, the display 10 includes additional display sections. These additional display sections may be left and right side display sections 80 and 82 disposed to the sides of the upper and lower display sections 18 and 20 to further facilitate the effective three-dimensional view of the display 10. Image display surfaces 84 and 86 of the side display sections 80 and 82 display left and right image sections, respectively, obtained by the camera 42. In the other implementations, the data contained in the side image sections may be part of the upper and/or lower image sections. In any case, the side display surfaces 84 and 86 may each define an obtuse angle with the upper display surface 28, and the lower display surface 30 may have a trapezoidal shape to provide a seamless appearance with the side display surfaces 84 and 86.

The side display sections 80 and 82 may each be any types of displays, such as the types listed above. The side display sections 80 and 82 may also be well-know types of displays that are transparent or translucent in some operating modes. For example, when the vehicle is not in reverse gear, the side display sections 80 and 82 may be transparent and one or more vehicle instruments, such as a speedometer, tachometer, or the like, may be viewed therethrough.

In some implementations, the system may include multiple backup cameras 42. The cameras 42 may obtain separate images, and the processor 44 may use well-know image stitching techniques to create a composite image. The composite image may then be displayed in multiple sections on the display 10.

In some implementations, the display 10 only depicts the backup image when the vehicle's transmission is shifted to reverse gear and shortly after shifting out of reverse gear. When shifted to other gears, the display 10 selectively depicts a navigation map and instructions, vehicle operation parameters, or other information.

In some implementations, the processor 44 identifies the horizon in the backup image using known image analysis and object recognition processes. The processor 44 then divides the image in a manner that positions the horizon at the interface between the upper and lower display surfaces 28 and 30.

In some implementations, the display system 40 omits the processor 44 and the backup camera 42 directly transmits an image signal to the display 10. The display 10 divides the image signal between the upper and lower display surfaces 28 and 30 using any appropriate known image-splitting processes.

In some implementations, one or both of the upper and lower display sections 18 and 20 are touch-sensitive and depict various buttons that may be pressed to control various vehicle systems (for example, audio equipment, the climate control system, and the like).

The technology described herein may be implemented as logical operations and/or modules. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations may be performed in any order, unless explicitly claimed otherwise or a specific order is inherently necessitated by the claim language.

Various embodiments of the present disclosure may be programmed using any object-oriented programming language, such as SmallTalk, Java, C++, Ada, or C#. Other object-oriented programming languages may also be used. Alternatively, functional, scripting, and/or logical programming languages may be used. Various aspects of this disclosure may be implemented in a non-programmed environment, for example, documents created in HTML, XML, or other format that, when viewed in a window of a browser program, render aspects of a GUI or perform other functions. Various aspects of the disclosure may be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

Although the present disclosure has been described with respect to preferred embodiments, any person skilled in the art will recognize that changes may be made in form and detail, and equivalents may be substituted for elements of the disclosure without departing from the spirit and scope of the disclosure. Therefore, it is intended that the disclosure not be limited to the particular embodiments, but will include all embodiments falling within the scope of the appended claims.

What is claimed is:

1. A display system for a vehicle, the system comprising:
   at least one camera supported by the vehicle and creating an image of a vehicle environment in which the vehicle is disposed;
   a processor configured to:
      receive the image from the at least one camera,
      identify a horizon in the image, and
      divide the image at the horizon to generate a first image section of a first portion of the vehicle environment and a second image section of a second portion of the vehicle environment adjacent the first portion of the vehicle environment;
   a display supported by the vehicle and operatively connected to the processor to receive the first and second image sections, the display including:
      a first display section having a first display surface disposed at a first angle, the first display surface displaying the first image section; and
      a second display section having a second display surface disposed at a second angle such that the second display surface and the first display surface define an obtuse angle therebetween, and the second display section displaying the second image section,
   wherein at least one of the first and second display sections is configured to be transparent upon detecting at least one selected operating mode of the vehicle.

2. The system of claim 1, wherein the first angle is defined relative to a horizontal plane, the second angle is defined relative to the horizontal plane, and the obtuse angle is disposed substantially in a vertical plane.

3. The system of claim 2, wherein the first portion of the vehicle environment is proximate the vehicle and the second portion of the vehicle environment is adjacent the first portion of the vehicle environment and further from the vehicle than the first portion of the vehicle environment.

4. The system of claim 1, wherein the at least one camera is only one camera.

5. The system of claim 1, further comprising a global positioning system receiver for determining a position of the vehicle in the vehicle environment, the global positioning system receiver being operatively connected to the processor to send vehicle positioning data to the processor, the processor creating a map corresponding to the vehicle positioning data, and the first display section and the second display section displaying the map.

6. The system of claim 5, wherein the map includes navigation instructions, and the second display section displays the navigation instructions.

7. A vehicle, comprising:
   an internal cabin that houses a support structure;
   at least one backup camera supported externally from the internal cabin and creating a rearward image of a vehicle environment in which the vehicle is disposed, the rearward image including a lower image section of a lower portion of the vehicle environment and an upper image section of an upper portion of the vehicle environment;
   a display supported by the support structure within the internal cabin, the display operatively connected to the at least one backup camera to receive the upper and lower image sections, and the display including:
      a lower display section disposed in a first plane and displaying the lower image section; and
      an upper display section disposed in a second plane, the second plane and the first plane defining an angle therebetween substantially disposed in a vertical plane, and the upper display section displaying the upper image section,
   wherein at least one of the lower and upper display sections is configured to be transparent upon detecting at least one selected operating mode of the vehicle.

8. The vehicle of claim 7, wherein at least 70 percent of the upper display section is disposed above the lower display section in a vertical direction.

9. The vehicle of claim 7, wherein the support structure includes a dashboard.

10. The vehicle of claim 9, wherein the dashboard fixedly supports the lower display section and the upper display section.

11. The vehicle of claim 7, further comprising a processor operatively connecting the at least one backup camera and the display.

12. The vehicle of claim 11, further comprising a global positioning system receiver for determining a position of the vehicle in the vehicle environment, the global positioning system receiver being operatively connected to the processor to send vehicle positioning data to the processor, the processor creating a map corresponding to the vehicle positioning data, and the lower display section and the upper display section displaying the map.

13. The vehicle of claim 7, wherein the at least one backup camera is only one backup camera.

14. A method of displaying information in a vehicle, the method comprising:
   obtaining an image of a portion of a vehicle environment in which a vehicle is disposed via at least one rearwardly facing camera supported by the vehicle;
   transmitting the image to a display including a lower display section having a lower viewing surface and an upper display section having an upper viewing surface, the lower viewing surface and the upper viewing surface defining an obtuse angle therebetween;
   displaying a lower image section of the image via the lower viewing surface; and
   displaying an upper image section of the image via the upper viewing surface,
   wherein at least one of the lower and upper display sections is configured to be transparent upon detecting at least one selected operating mode of the vehicle.

15. The method of claim 14, wherein the lower viewing surface is disposed at a first angle relative to a horizontal plane, the upper viewing surface is disposed at a second angle relative to the horizontal plane, and the first angle and the second angle define the obtuse angle therebetween.

16. The method of claim 14, wherein the transmitting the image includes:
   transmitting the image from the at least one camera to a processor; and
   transmitting the image from the processor to the display.

17. The method of claim 16, further comprising:
   determining a position of the vehicle in the vehicle environment via a global positioning system receiver; and
   sending vehicle positioning data, the global positioning system receiver being operatively connected to the processor to send vehicle positioning data to the processor, the processor creating a map corresponding to the vehicle positioning data, and the lower display section and the upper display section displaying the map.

18. The method of claim 14, wherein the vehicle includes a support, and the support fixedly supports the lower display section and the upper display section.

19. The method of claim 14, wherein the obtuse angle is disposed substantially in a vertical plane.

\* \* \* \* \*